Patented June 23, 1936

2,045,062

UNITED STATES PATENT OFFICE 2,045,062

PROCESS FOR PREPARING D-TRANS-π-OXO-CAMPHOR FROM ISO-KETOPINIC ACID

Yasuhiko Asahina and Morizo Ishidate, Tokyo, Japan

No Drawing. Application March 22, 1935, Serial No. 12,516. In Japan July 20, 1934

2 Claims. (Cl. 260—133)

This invention relates to improvements in a process for preparing d-trans-π-oxocamphor from isoketopinic acid, and the object of the same is to obtain a material having a cordiotonic action at a high purity and a good percentage of yield.

The raw material used in this invention, d-isoketopinic acid, is also known as d-trans-π-apocamphor-7-carboxylic acid, and is obtained from d-α-bromocamphor according to the method of Kipping and Pope (J. Chem. Soc. 63, 554, 1893), and subsequently according to the method of Wedkind, Schenk, and Stusser (B. 56, 633, 1923) as the following expression: d-α-bromocamphor→d-bromocamphor-π-sulphonic acid→d-camphor-π-sulphonic chloride→d-camphor-π-chlorosulphoxide→d-iso-ketopinic acid. It is also prepared from α-π-bromocamphor (Kipping and Pope: J. Chem. Soc. 67, 382, 1895) by acetylating, saponifying (Sahashi and Iki: Scientific Papers of the Instit. Phys. Chem. Research, Tokyo, vols. 25, 73, 1934), and susbsequently oxidizing the obtained π-hydroxycamphor. It has a chemical construction as hereinafter indicated by reference number I having prismatic crystals, and its melting point is 249° C. to 250° C.

According to this invention, this substance is changed into the chloride at first, and next the chloride is reduced by hydrogen in the presence of palladium or a substance containing palladium as a catalyst, so that the final product is obtained.

The invention is explained in detail by way of an example. A mixture of 10 parts in weight of d-iso-ketopinic acid and 20 parts in weight of thionyl chloride is heated on fire so as to be mildly boiled for about one hour when emission of hydrochloric acid gas from the mixture ceases.

The mixture is next heated on a water bath under a reduced pressure so that excess of thionyl chloride is evaporated. The residue is crystallized from light petroleum. The pure substance is white crystals having melting point of 128° C., and the yield is substantially theoretical. The chemical construction is hereinafter indicated by reference Number II.

10 parts in weight of the chloride of iso-ketopinic acid is dissolved in 100 parts in weight of pure xylene, toluene or benzene. This solution is taken into a cylindrical vessel, and 0.1 part in weight of powdered metallic palladium or 1 to 2 parts in weight of powdered palladium-bariumsulfate or palladium-charcoal (the content of palladium is about 5%) is suspended in the solution. Into this solution is violently sent well washed and dried hydrogen gas keeping the solution at the boiling temperature of the solvent used until emission of hydrochloric acid ceases.

The treated solution is filtered so as to separate the catalyst, and the filtrate is evaporated under a partial vacuum and a white crystalline material is obtained. This is the crude final substance.

In order to purify this material it is dissolved in ether, and this solution is shaken several times with 5% aqueous solution of sodiumbisulphite so that aldehydic substance in the material is changed into a compound of sodiumsulphite. This aqueous solution is washed with ether and to this is added a potassium carbonate or caustic alkali, when the aldehyde is deposited. This precipitate is taken up by ether and the ether is distilled off, and the residue is almost pure trans-π-oxocamphor. 7 to 8 parts in weight of the final product are obtained from 10 parts of the chloride.

This substance is white powder and its melting point is 195° C. The chemical construction is shown by the reference Number III, in the following expression. The course of reaction can be shown by an expression,

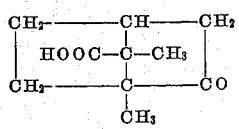 → 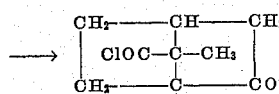 → 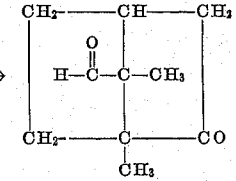

I  II  III

The product of this invention has a cardiotonic action, and can be used for medical purposes.

What we claim is:—

1. A process for preparting trans-π-oxocamphor from iso-ketopinic acid comprising transforming the latter into an acid chloride, and reducing the acid chloride by hydrogen gas in the presence of a material selected from the group consisting of metallic palladium, palladium-barium-sulfate and palladium-charcoal as a catalyst.

2. A process for preparting trans-π-oxocamphor from iso-ketopinic acid comprising transforming the latter into an acid chloride, and sending hydrogen gas into xylene solution of the acid chloride keeping the solution at the boiling temperature of xylene in the presence of palladium powder which has been suspended in the solution.

YASUHIKO ASAHINA.
MORIZO ISHIDATE.